B. F. Wilson.

Feed Water Heater.

Nº 89,106.  Patented Apr. 20, 1869.

Witnesses
M. V. Thompson
John W. Heavy

Inventor
Benjamin F. Wilson

BENJAMIN F. WILSON, OF GEDDES, NEW YORK.

*Letters Patent No. 89,106, dated April 20, 1869.*

IMPROVEMENT IN FILTERING FEED-WATER HEATERS FOR STEAM-GENERATORS.

The Schedule referred to in these Letters Patent and making part of the same.

*To all whom it may concern:*

Be it known that I, BENJAMIN F. WILSON, of Geddes, in the county of Onondaga, in the State of New York, have invented a new and useful Improvement in Filtering Heaters, for the purpose of heating and filtering water for steam-boilers, and other liquids; and I do hereby declare that the following is a full, clear, and exact description of the construction and operation of the same, reference being had to the annexed drawings, making a part of this specification, in which—

Figure 1:
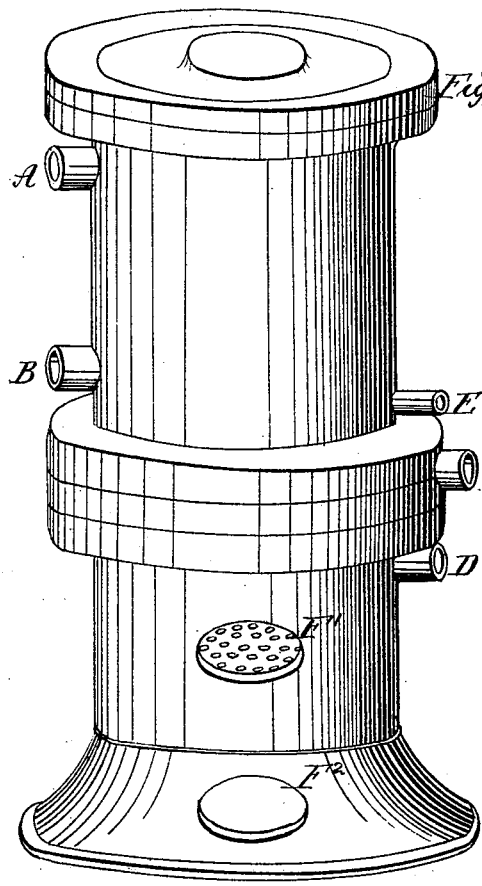
Figure 2:
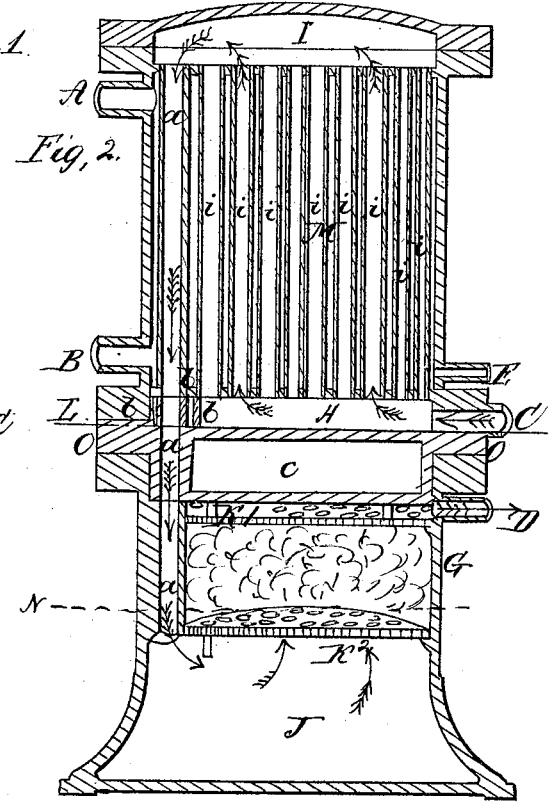
Figure 3:
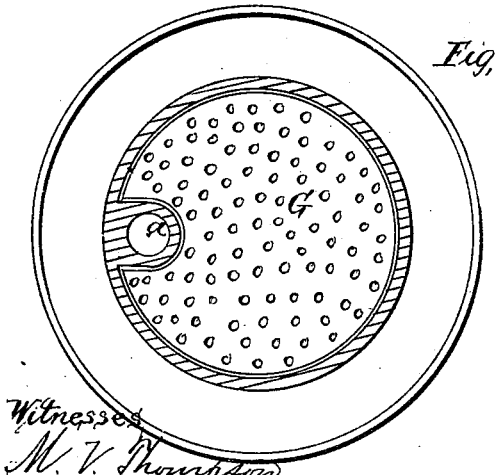
Figure 4:
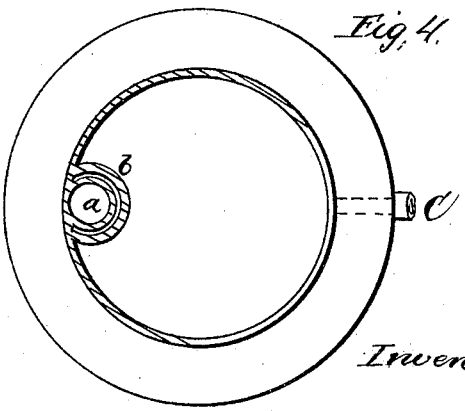

Figure 1 is a perspective view.
Figure 2, a vertical section.
Figure 3, a cross-section through N, fig. 2.
Figure 4, a cross-section through L, fig. 2.

The nature of my invention consists in the construction of air-chambers or spaces between the hot and cold water or other liquid in the heater, and in the arrangement of devices for conveying the heated water or other liquid from the heating-chamber to the filter.

To enable others skilled in the art to make and use my invention, I will proceed to describe its construction and operation.

The heater is constructed in any convenient form, with a heating-chamber, M, fig. 2, through which pass tubes $i\ i\ i$, with a distributing-chamber, H, at one end of the tubes, and a returning-chamber, I, at the other end.

Descending pipe $a\ a\ a$, which is made by section O having a passage made through it, and also through the lower section, extends from the returning-chamber I to the settling-chamber or mud-catcher J, which serves as a receptacle for the mud, lime, or other impurities in the water or other liquid.

A filtering-chamber, G, between the two perforated plates $K^1\ K^2$, filled with sponge, or other suitable material, further cleanses the water or other liquid.

Hand-holes $F^1\ F^2$, fig. 1, are for the purpose of cleaning the filter G and mud-catcher J.

Air-spaces or chambers $b, b$, and $c$, filled with air, or some non-conducting material, are provided, for the purpose of protecting the hot-water, or other hot liquid, from the cooling-effect of that in the distributing-chamber H.

The operation is as follows:

The water or other liquid is conducted into the heater through the pipe C; thence, passing through tubes $i\ i\ i$, in heating-chamber M, to returning-chamber I; thence, through descending or returning-tube $a\ a\ a$, to settling-chamber or mud-catcher J, where it deposits sediment. It passes through perforated plate $K^2$, filter G, perforated plate $K^1$, and is then discharged, hot and clean, through pipe D, to a boiler, or elsewhere.

Pipes A and B are provided, for the purpose of heating the chamber M with steam or hot air, or other hot gases.

Pipe E is provided, so that, when the chamber is heated with steam or other saturated gas, any portion which may condense to a liquid form may be drawn off, so as not to impair the heating-effect of tubes $i\ i\ i$.

I do not claim heating-chamber M, heating-tubes $i\ i$, mud catcher J, or filter G, the same having been used before.

What I claim as my invention, and desire to secure by Letters Patent, is—

1. The air-chamber $c$, when arranged, with reference to the chambers M and I and tube $a$, substantially in the manner shown and described.

2. The arrangement of the air-space $b\ b$, pipes A, B, C, D, and E, filter G, plates $K^1\ K^2$, catcher J, and chambers H and I, in the manner substantially as set forth.

3. The arrangement of parts making the continuous passage $a\ a\ a$, whereby to heat and filter the feed-water or other liquid, substantially in the manner specified.

BENJAMIN F. WILSON.

Witnesses:
CHAS. C. SNOW,
EDM. F. BROWN.